US008772967B1

(12) United States Patent
Ikriannikov et al.

(10) Patent No.: US 8,772,967 B1
(45) Date of Patent: Jul. 8, 2014

(54) MULTISTAGE AND MULTIPLE-OUTPUT DC-DC CONVERTERS HAVING COUPLED INDUCTORS

(75) Inventors: Alexandr Ikriannikov, Castro Valley, CA (US); Ognjen Djekic, San Francisco, CA (US)

(73) Assignee: Volterra Semiconductor Corporation, San Jose, CA (US)

( * ) Notice: Subject to any disclaimer, the term of this patent is extended or adjusted under 35 U.S.C. 154(b) by 691 days.

(21) Appl. No.: 13/040,961

(22) Filed: Mar. 4, 2011

(51) Int. Cl.
*H02M 3/00* (2006.01)

(52) U.S. Cl.
USPC .............................. 307/82; 307/77; 307/151

(58) Field of Classification Search
CPC ...................................................... H02M 3/00
USPC ............................................. 307/77, 82, 151
See application file for complete search history.

(56) References Cited

U.S. PATENT DOCUMENTS

| | | | |
|---|---|---|---|
| 4,531,085 A | | 7/1985 | Mesenhimer |
| 5,003,277 A | | 3/1991 | Sokai et al. |
| 5,166,869 A | * | 11/1992 | Hesterman ...................... 363/25 |
| 5,204,809 A | | 4/1993 | Andresen |
| 5,317,496 A | * | 5/1994 | Seiersen ......................... 363/24 |
| 5,436,818 A | | 7/1995 | Barthold |
| 5,469,334 A | | 11/1995 | Balakrishnan |
| 6,084,790 A | * | 7/2000 | Wong ............................... 363/71 |
| 6,304,460 B1 | * | 10/2001 | Cuk ................................ 363/16 |
| 6,307,757 B1 | | 10/2001 | Porter et al. |
| 6,362,986 B1 | | 3/2002 | Schultz et al. |
| 6,388,896 B1 | | 5/2002 | Cuk |
| 6,462,964 B2 | | 10/2002 | Porter et al. |
| 6,545,450 B1 | | 4/2003 | Ledenev et al. |
| 6,583,992 B2 | | 6/2003 | Porter et al. |
| 6,590,786 B2 | | 7/2003 | Gurov |
| 6,590,791 B1 | | 7/2003 | Zhou et al. |
| 6,686,727 B2 | | 2/2004 | Ledenev et al. |
| 6,694,438 B1 | | 2/2004 | Porter et al. |
| 6,696,823 B2 | | 2/2004 | Ledenev et al. |
| 6,784,644 B2 | | 8/2004 | Xu et al. |

(Continued)

FOREIGN PATENT DOCUMENTS

| | | |
|---|---|---|
| EP | 0 755 060 | 1/1997 |
| EP | 1 632 964 | 3/2006 |
| JP | 11 307369 | 11/1999 |
| WO | WO 02/17469 | 2/2002 |

OTHER PUBLICATIONS

Nakanashi, H. et al., "A Two-stage Converter With a Coupled-Inductor," 7th International Conference on Power Electronics and Drive Systems, 2007, 653-657 (PEDS'07).

(Continued)

*Primary Examiner* — Adi Amrany
(74) *Attorney, Agent, or Firm* — Lathrop & Gage LLP

(57) ABSTRACT

A multiple-output DC-DC converter has a first and a second DC-DC sub-converter, each DC-DC subconverter may be a buck, boost, or buck-boost converter having a primary energy-storage inductor. Each DC-DC subconverter drives a separate output of the multiple-output converter and typically has a separate feedback control circuit for controlling output voltage and/or current. The converter has a common timing circuit to maintain a phase offset between the first and DC-DC subconverters. The primary energy storage inductors of the first and second DC-DC converter are magnetically coupled to raise an effective ripple frequency of the converter and simplify output filtering.

10 Claims, 10 Drawing Sheets

(56) References Cited

U.S. PATENT DOCUMENTS

| | | | |
|---|---|---|---|
| 6,838,863 B2 | 1/2005 | Hazucha et al. | |
| 6,979,980 B1 | 12/2005 | Hesterman et al. | |
| 6,989,997 B2 * | 1/2006 | Xu et al. | 363/16 |
| 7,023,186 B2 * | 4/2006 | Yan | 323/225 |
| 7,026,800 B2 * | 4/2006 | Liu et al. | 323/270 |
| 7,110,266 B1 | 9/2006 | Porter et al. | |
| 7,199,695 B1 | 4/2007 | Zhou et al. | |
| 7,233,132 B1 | 6/2007 | Dong et al. | |
| 7,239,530 B1 | 7/2007 | Djekic et al. | |
| 7,301,317 B1 * | 11/2007 | Mattingly | 323/282 |
| 7,315,463 B2 | 1/2008 | Schrom et al. | |
| 7,317,305 B1 | 1/2008 | Stratakos et al. | |
| 7,352,269 B2 | 4/2008 | Li et al. | |
| 7,423,894 B2 | 9/2008 | Ilic | |
| 7,463,498 B1 | 12/2008 | Djekic et al. | |
| 7,498,920 B2 | 3/2009 | Sullivan et al. | |
| 7,504,808 B2 | 3/2009 | Schrom et al. | |
| 7,821,375 B2 * | 10/2010 | Dong et al. | 336/232 |
| 7,859,238 B1 | 12/2010 | Stratakos et al. | |
| 7,893,669 B2 * | 2/2011 | Osterhout et al. | 323/272 |
| 7,994,888 B2 | 8/2011 | Ikriannikov | |
| 8,125,205 B2 * | 2/2012 | Chandrasekaran et al. | 323/282 |
| 8,179,116 B2 * | 5/2012 | Wei et al. | 323/331 |
| 8,207,717 B2 * | 6/2012 | Uruno et al. | 323/262 |
| 8,233,298 B2 * | 7/2012 | Jang et al. | 363/67 |
| 8,416,043 B2 * | 4/2013 | Ikriannikov | 336/83 |
| 8,570,009 B2 * | 10/2013 | Wei et al. | 323/272 |
| 2003/0102849 A1 * | 6/2003 | Schiff et al. | 323/222 |
| 2003/0155894 A1 * | 8/2003 | Dubhashi et al. | 323/225 |
| 2006/0012348 A1 | 1/2006 | Zhao et al. | |
| 2006/0197510 A1 | 9/2006 | Chandrasekaran | |
| 2006/0226130 A1 * | 10/2006 | Kooken et al. | 219/130.1 |
| 2007/0076453 A1 | 4/2007 | Schultz et al. | |
| 2007/0097571 A1 | 5/2007 | Dinh et al. | |
| 2007/0175701 A1 | 8/2007 | Xu et al. | |
| 2007/0176726 A1 | 8/2007 | Xu et al. | |
| 2008/0100273 A1 * | 5/2008 | Uruno et al. | 323/271 |
| 2008/0150666 A1 | 6/2008 | Chandrasekaran et al. | |
| 2008/0169769 A1 | 7/2008 | Lee | |
| 2008/0205098 A1 | 8/2008 | Xu et al. | |
| 2008/0309299 A1 * | 12/2008 | Wei et al. | 323/247 |
| 2009/0001945 A1 | 1/2009 | Wickersham et al. | |
| 2009/0146622 A1 | 6/2009 | McDonald et al. | |
| 2009/0179723 A1 | 7/2009 | Ikriannikov et al. | |
| 2009/0206663 A1 * | 8/2009 | Liu | 307/31 |
| 2009/0231081 A1 | 9/2009 | Ikriannikov et al. | |
| 2009/0237197 A1 | 9/2009 | Ikriannikov et al. | |
| 2009/0303762 A1 * | 12/2009 | Jang et al. | 363/61 |
| 2010/0013304 A1 * | 1/2010 | Heineman | 307/31 |
| 2010/0097045 A1 * | 4/2010 | Chen | 323/290 |
| 2011/0013437 A1 * | 1/2011 | Uruno et al. | 363/126 |
| 2011/0018669 A1 | 1/2011 | Ikriannikov | |
| 2011/0032068 A1 | 2/2011 | Ikriannikov | |
| 2011/0035607 A1 | 2/2011 | Ikriannikov | |
| 2011/0043317 A1 * | 2/2011 | Ikriannikov | 336/192 |
| 2011/0285369 A1 * | 11/2011 | Cuk | 323/282 |

OTHER PUBLICATIONS

Chandrasekaran, S. et al., "Integrated Magnetics for Interleaved DC-DC Boost for Fuel Cell Powered Vehicles," 35th Annual IEEE Power Electronics Specialists Conferences, 356-61 (2004).

Dong et al., Twisted Core Coupled Inductors for Microprocessor Voltage Regulators, Power Electronics Specialists Conference, pp. 2386-2392, Jun. 17-21, 2007.

Dong et al., The Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Wong, Pit-Leong, et al., Investigating Coupling Inductors in the Interleaving QSW VRM Applied Power Electronics Conference and Exposition, 2000. APEC 2000. Fifteenth Annual IEEE; Mar. 2000; pp. 973-978.

Wong, Pit-Leong, et al.; A Novel Modeling Concept for Multi-coupling Core Structures; Center for Power Electronics Systems; IEEE, Mar. 2001.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

* cited by examiner

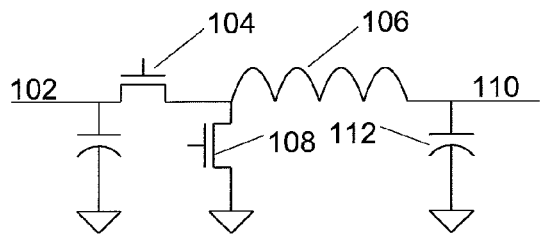
PRIOR ART  FIG. 1
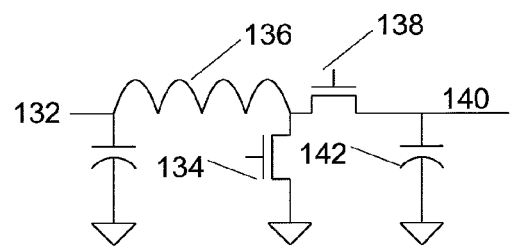
PRIOR ART  FIG. 2
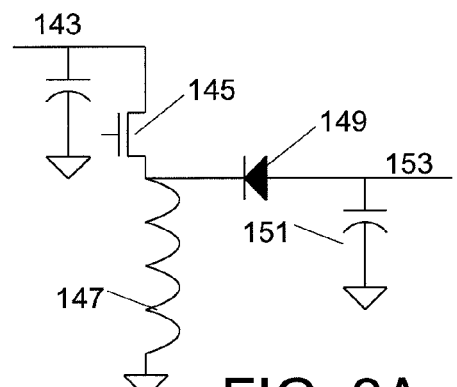
FIG. 2A
PRIOR ART
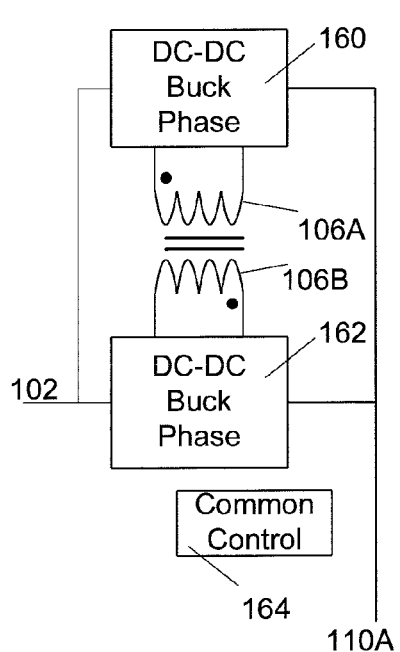
FIG. 3
PRIOR ART

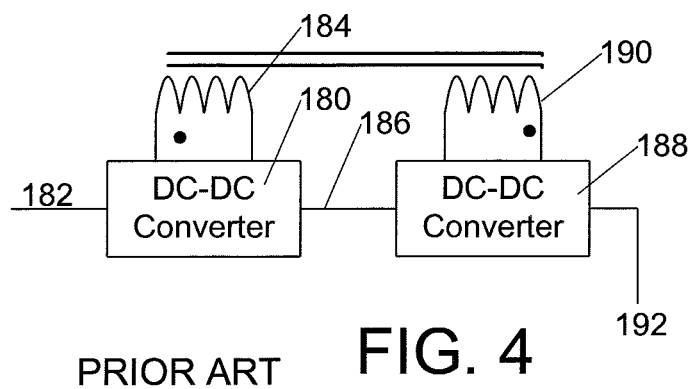
PRIOR ART  FIG. 4
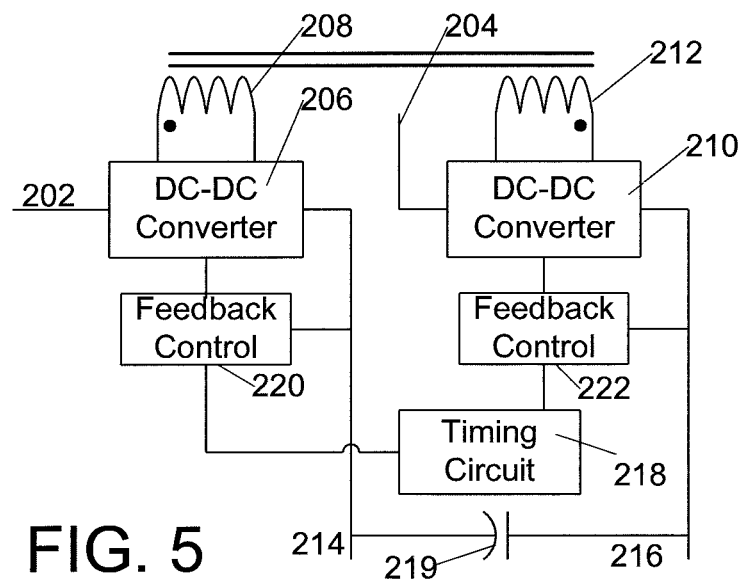
FIG. 5

US 8,772,967 B1

MULTISTAGE AND MULTIPLE-OUTPUT DC-DC CONVERTERS HAVING COUPLED INDUCTORS

FIELD

The present document pertains to the field of multistage DC-DC converters.

BACKGROUND

It is often necessary to convert power provided by a voltage source at a first DC voltage into power at a different DC voltage; this is typically done by DC-DC converters. DC-DC converters are commonly used in battery chargers, radios, television receivers, computers, cell phones and other devices. It is desirable that these converters operate with high efficiency. It is also often desirable that these converters be low in cost, since they are often manufactured in very high volumes.

It is often necessary to convert power provided by a voltage source at a first DC voltage into power at a different DC voltage; this is typically done by DC-DC converters. DC-DC converters are commonly used in battery chargers, radios, television receivers, computers, cell phones and other devices. It is desirable that these converters operate with high efficiency. It is also often desirable that these converters be low in cost, since they are often manufactured in very high volumes.

A common DC-DC converter architecture, as illustrate in FIG. 1, is the buck converter. These converters typically operate as a step-down converter where a high input voltage 102 is coupled by switching device 104 to inductor 106 during a first interval, both storing energy in magnetic fields of inductor 106 and providing current to an output 110 and an output filtering capacitor 112; then in a second interval switching device 104 turns off and current continues to flow in inductor 106 and a second switching device or diode 108 while the magnetic fields of inductor 106 decay. Filtering capacitor 112 helps level the output 110 voltage, and provides power to the load during any interval in which inductor 106 is not conducting current.

Another common DC-DC converter architecture, as illustrated in FIG. 2, is the boost converter. These operate by closing a switching device 134 to build up a current and store energy in an inductor 136 from an input power supply 132 during a first interval, then in a second interval opening switching device 134 and drawing energy from the inductor 136 through a second switching device or diode 138 to drive a load 140. A capacitor 142 may be provided as a filter that provides energy to the load when device 138 is not conducting.

Yet another common DC-DC converter architecture, as illustrated in FIG. 2A is the buck-boost converter. These operate by closing a switching device 145 to build up a current in inductor 147 from an input power supply 143 during a first interval, then in a second interval opening switching device 145 and drawing energy from the inductor 147 through a second switching device or diode 149 into a filtering capacitor 151 and load 153.

Buck, boost, and buck-boost converters provide an output power having a ripple component which must be filtered by capacitors 112, 142, 151. In a buck converter as illustrated in FIG. 1, inductor 106 operates to store energy while switching device 104 conducts, and to release energy during at least part of the time switching device 104 is off, similarly the boost converter of FIG. 2 stores energy in inductor 136 when switching device 134 conducts, and releases energy during at least part of the time switching device 134 is off, and the buck-boost converter of FIG. 2A stores energy in inductor 147 when switching device 145 conducts and releases that energy during at least part of the time switching device 145 is off; inductors 147, 136 and 106 are therefore the primary energy storage inductors of these converters. Additional inductors may be present in buck, boost, and buck-boost configurations for such purposes as filtering on input and output terminals, and other purposes.

When large output currents are required, it is common to couple multiple DC-DC converter units, such as the buck converter of FIG. 1, in parallel having a common input 102 and output 110A, such as shown in FIG. 3. Since the capacitance required for reducing ripple by filtering is inversely proportional to a frequency of the ripple component, operation of switching devices, such as switching devices 104, 108, of each parallel-connected converters 160, 162 are typically offset in time from one converter 160 to another 162, this results in effectively multiplying a frequency of the ripple component by the number of parallel connected converters and reducing required capacitance of filter capacitors 112. Because of the time-offset, each converter 160, 162, of such a parallel arrangement of DC-DC converters is known as a phase of the overall converter system.

It is known that efficiency of parallel DC-DC converter units is enhanced, and ripple reduced, if there is a degree of magnetic coupling between the inductor 106A (representing primary energy storage inductor 106 of a first component buck converter similar to that of FIG. 1) of one phase 160, with the inductor 106B (representing primary energy storage inductor 106 of another component buck converter similar to that of FIG. 1) of a second phase 162 having timing offset from that of the first phase. Such an arrangement appears in U.S. Pat. No. 6,362,986 to Schultz et al. (Schultz), which is incorporated herein by reference. Typically, such a converter arrangement also has a common control circuit 164 that controls all phases, such as phases 160, 162, to provide proper drive to the output 110A. Since the output voltage of all of the parallel-coupled converters is the same, these converters are not independent converters.

It is also known that perfect coupling between primary energy storage inductors of different phases of paralleled DC-DC converters is undesirable. In various embodiments, these converters may use a transformer formed of coupled inductors having substantial leakage inductance, or a transformer with a separate inductor in series with each winding of the transformer; the term magnetically coupled inductors in this document shall include both configurations.

DC-DC converters having large differences between input and output voltages can potentially have improved efficiency if they include a first-stage converter that converts an input voltage to an intermediate voltage, and a second-stage converter that converts the intermediate voltage to the required output voltage. H. Nakanishi, et al., in A Two-stage Converter with a Coupled-Inductor, 7th International Conference on Power Electronics and Drive Systems, 2007, 653-657 (PEDS '07), reported an analysis of a two-stage buck-converter arrangement similar to that illustrated in FIG. 4. In the arrangement of PEDS '07, a first buck converter 180 having inductor 184 reduces an input voltage 182 to an intermediate voltage 186. A second buck converter 188 having inductor 190 reduces the intermediate voltage to output voltage 192. Inductors 184 and 190 are magnetically coupled—PEDS '07 shows each inductor winding as having an ideal transformer portion and an inductor portion. The circuit analyzed in PEDS '07 is limited, however, to one input 182 and one output 192, and does not disclose separate feedback control loops for the converter.

A converter as illustrated in FIG. 3 has a single input and a single output voltage. There are many applications where more than one output voltage is desired in a system; for example a common personal computer may operate a processor core at 1.5 volts, a processor periphery and memory at 3.3 volts, other logic at 5.0 volts, disk motors at 12.0 volts, and other circuitry at −5.0 volts. It is desirable to provide regulated outputs at more than one output voltage to enable operation of such systems.

SUMMARY

A multiple-output DC-DC converter has at least a first and a second DC-DC sub-converter, each DC-DC subconverter may be a buck, boost, or buck-boost converter having a primary energy-storage inductor. Each DC-DC subconverter drives a separate output of the multiple-output converter and typically has a separate feedback control circuit for controlling output voltage and/or current. The converter has a common timing circuit to maintain a phase offset between the first and second DC-DC subconverters. The primary energy storage inductors of the first and second DC-DC converter are magnetically coupled to raise an effective ripple frequency of the converter and simplify output filtering.

In an alternative embodiment, a multiple-output DC-DC converter has a first subconverter driving an intermediate voltage providing an output of the converter, and providing input to a second subconverter of the multiple output converter.

BRIEF DESCRIPTION OF THE FIGURES

FIG. 1 is a schematic diagram of a PRIOR ART buck converter.

FIG. 2 is a schematic diagram of a PRIOR ART boost converter.

FIG. 2A is a schematic diagram of a PRIOR ART buck-boost converter.

FIG. 3 is a schematic diagram of PRIOR ART parallel-connected buck converters having coupled inductors to enhance efficiency.

FIG. 4 is a schematic diagram of PRIOR ART series-connected buck converters having coupled inductors to enhance efficiency.

FIG. 5 is a schematic diagram of a multiple-output converter having two converters having separate inputs, separate outputs, coupled inductors, and a common timing circuit.

DETAILED DESCRIPTION OF THE EMBODIMENTS

Figure 6:
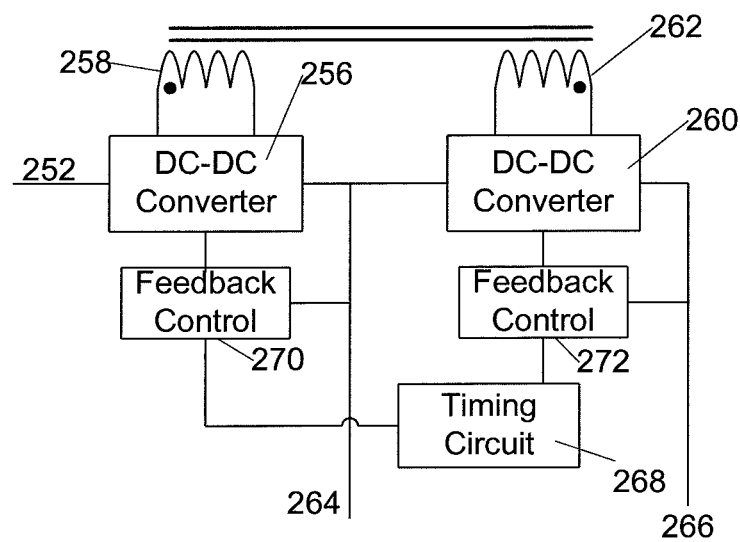
FIG. 6 is a schematic diagram of a multistage converter including a first subconverter that provides output to both an output of the converter and an input to a second subconverter that provides a second output of the converter.

It has been found that inductors coupled between converters for ripple reduction and efficiency enhancement need not be associated with the same inputs, outputs, or even converters of the same type, for effectiveness at reducing ripple. They do, however, need to operate with appropriately offset timing.

For example, consider the pair of converters illustrated in FIG. 5. In this embodiment, a first input 202 and a second input 204 are provided, in a particular embodiment first input 202 and second input 204 are different voltages. First input 202 powers a first DC-DC converter 206 having primary energy storage inductor 208, and second input 204 powers a second DC-DC converter 210 having primary energy storage inductor 212, in an embodiment the DC-DC converters 206, 210 are buck converters. First DC-DC converter 206 has an output 214, and second DC-DC converter 210 has an output 216, in the particular embodiment output 214 and output 216 are different voltages. Both first 206 and second 210 DC-DC converters receive timing control signals from a common timing circuit 218 such that input switches, such as switch 104, of each converter apply inputs 202, 204 to the inductors 208, 212 at different times, or phases, in a common cycle— the common timing circuit 218 acts as a phase control to ensure the first 206 and second 210 converters operate such that ripple tends to cancel. In an alternative embodiment, first input 202 and second input 204 are coupled to the same voltage source, but output 214 and 216 remain separate.

In the embodiment of FIG. 5 output 214 of the first DC-DC converter is separate from the output 216 of the second DC-DC converter. These outputs 214, 216, may, but need not, operate at the same voltage.

In the embodiment of FIG. 5, the primary energy storage inductors 208, 212 of both DC-DC converters are magnetically coupled.

Since outputs 214, 216 are separate, and may be subject to slightly differing loads, separate feedback control circuits 220, 222 are provided for adjusting on-time of input switch 104 in response to output voltage and/or current changes, 220 for DC-DC converter 206 and 222 for DC-DC converter 210.

In an alternative embodiment, the DC-DC converters 206, 210, are boost converters, in this embodiment the feedback control circuits 220, 222 adjust on-time of switch 134 in response to output voltage and/or current changes.

In a variation of the embodiment of FIG. 5, both inputs 202 and 204 are tied together and driven from a common input source.

Another embodiment, as illustrated in FIG. 6, has a first input 252 that powers a first DC-DC converter 256 having primary energy storage inductor 258 and drives a first output 264. First output 264 also powers a second DC-DC converter 260 having primary energy storage inductor 262, in an embodiment the DC-DC converters 256, 260 are buck converters. Second DC-DC converter 260 has an output 266; in the particular embodiment output 264 and output 266 are different voltages. Both first 256 and second 260 DC-DC converters receive timing control signals from a common timing circuit 268 such that input switches, such as switch 104, of each converter apply inputs 252, 264 to the inductors 258, 262 at different times, or phases, in a common cycle—the common timing circuit 268 acts as a phase control to ensure the first 256 and second 260 converters operate such that signals coupled between the first DC-DC converter's inductor 258 and second converter's inductor 262 tend to cancel ripple.

In the embodiment of FIG. 6, the primary energy storage inductors 258, 262 of both DC-DC converters are magnetically coupled.

Since outputs 264, 266 are separate, and may be subject to differing loads, separate feedback control circuits 270, 272 are provided for adjusting on-time of input switches 104 in response to output voltage and/or current changes, 270 for DC-DC converter 256 and 272 for DC-DC converter 260.

In an alternative embodiment, the DC-DC converters 256, 260, are boost converters, in this embodiment the feedback control circuits 270, 272 adjust on-time of switches 134 in response to output voltage and/or current changes to maintain proper regulation of the output.

Converters 206, 210, 256, 260 may be referred to as subconverters because they form a part of the larger DC-DC conversion system of which they are a part.

It has been estimated that, when operating at full power in both subconverters of FIG. 5 or FIG. 6, energy loss in a particular embodiment may be reduced by as much as 10%, with a boost in overall efficiency from about 92% to 93% or 94% while reducing the amount of capacitance required to properly filter one or more of the outputs by about 50%; the net effect is to reduce heat loss in the converter circuit significantly. Efficiency gains may vary substantially between embodiments and with differing operating conditions of particular embodiments, some other embodiments may encounter greater or lesser, or even zero, heat reduction or efficiency boosts under some conditions. In multistage converters resembling that of FIG. 6 and using buck converters, the ripple reduction in the lower-voltage output is particularly significant and may permit reduction in filter capacitance by as much as fifty percent.

Figure 7:
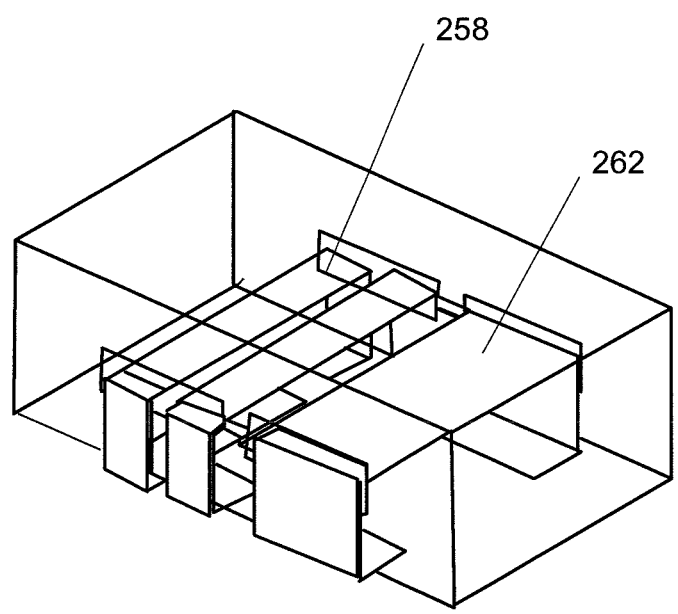
FIG. 7 is an illustration of an inductor such as may be used in an embodiment similar to FIG. 6.

In embodiments similar to those of FIG. 5 or FIG. 6 operating at substantially different voltages, it may be desirable to have a turns ratio N such that the primary energy-storage inductor of the higher-voltage converter has a greater number of turns than the primary energy-storage inductor of the lower-voltage converter. For example, in an embodiment similar to that of FIG. 6, where input 252 is twelve volts, output 264 is three and three tenths volts, and output 266 is nine-tenths volt, a turns ratio of 2:1 may be appropriate, with the primary energy storage inductor 262 of the lower-voltage converter having fewer turns; in such an embodiment a winding of the primary energy storage inductor 262 of the lower-voltage converter may also be of considerably heavier wire than that of the primary energy storage inductor 258 of the higher-voltage converter 256, as illustrated in FIG. 7; FIG. 7 illustrates inductor 258 with two turns, and inductor 262 with one turn. Other turns ratios between inductors of the converters may be appropriate for other voltage ratios and power outputs.

Figure 8:
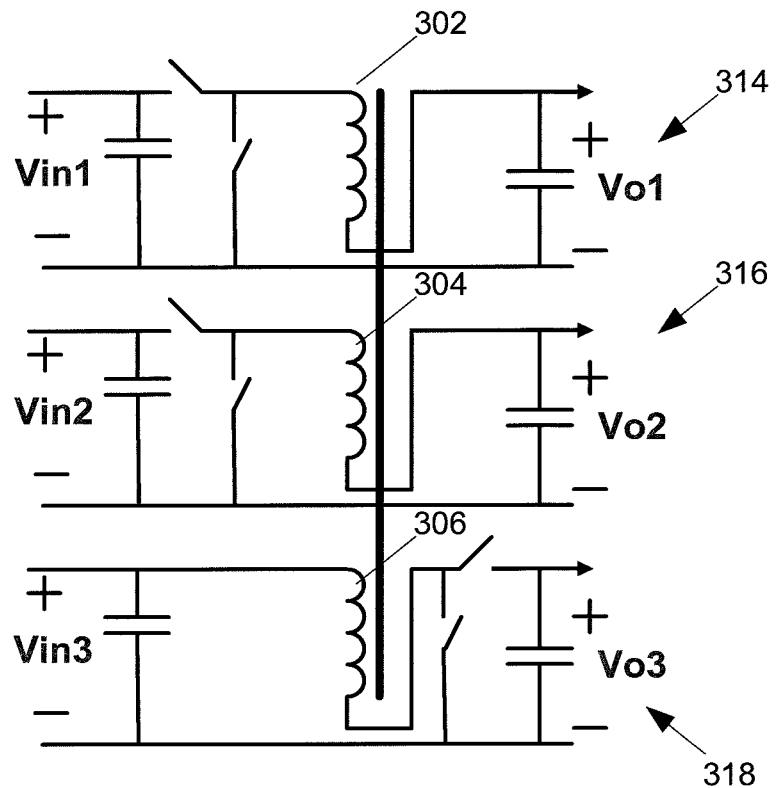
FIG. 8 is an illustration of an embodiment having three coupled inductors.
Figure 9:
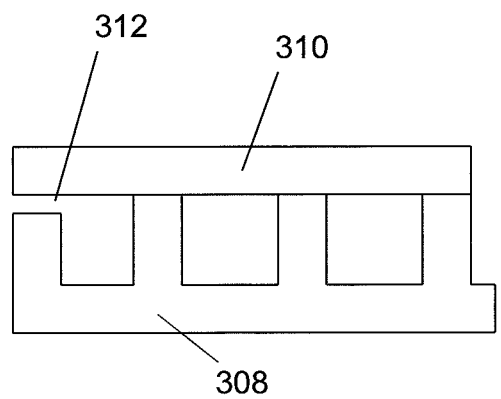
FIG. 9 is an illustration of a two-part core assembly suitable for use in the embodiment of FIG. 8 and other three-inductor embodiments.

FIG. 8 illustrates an embodiment having three mutually-coupled inductors, such as may be wound on a hub-and spoke core as illustrated in Schultz or as may be wound on a core having a three-legged E-shaped capped with an I-shaped magnetic element 310 (FIG. 9). FIG. 8 illustrates a pair of buck converters 314, 316 having coupled primary energy-storage inductors 302, 304, further coupled to a primary energy storage inductor 306 of a boost converter 318. Leakage inductance of multiple coupled inductors as used in FIG. 8 can be optimized for the voltage conversion application by adding an additional leg to the E-shaped core 308 with an air-gap 312 as illustrated in FIG. 9. Many other core and inductor configurations are possible, they will not all be detailed here. Further, many other combinations of magnetic coupling between buck, boost, or buck-boost converters are possible, many of which will act to reduce required output filtering capacitance by reducing ripple amplitude and increasing ripple frequency.

Returning to the two stage embodiment of FIG. 6, some buck converters can operate with a fixed duty cycle and will provide an output voltage roughly corresponding to (duty cycle)*(VIN), although this output is unregulated and low-load efficiency is reduced from that obtainable in discontinuous current mode (DCM); in these embodiments switch or diode 108 is ON whenever switching device 104 is OFF. In an embodiment, the feedback controller 270 associated with the first DC-DC converter 256 is replaced with a constant duty-cycle pulse generator.

Figure 10:
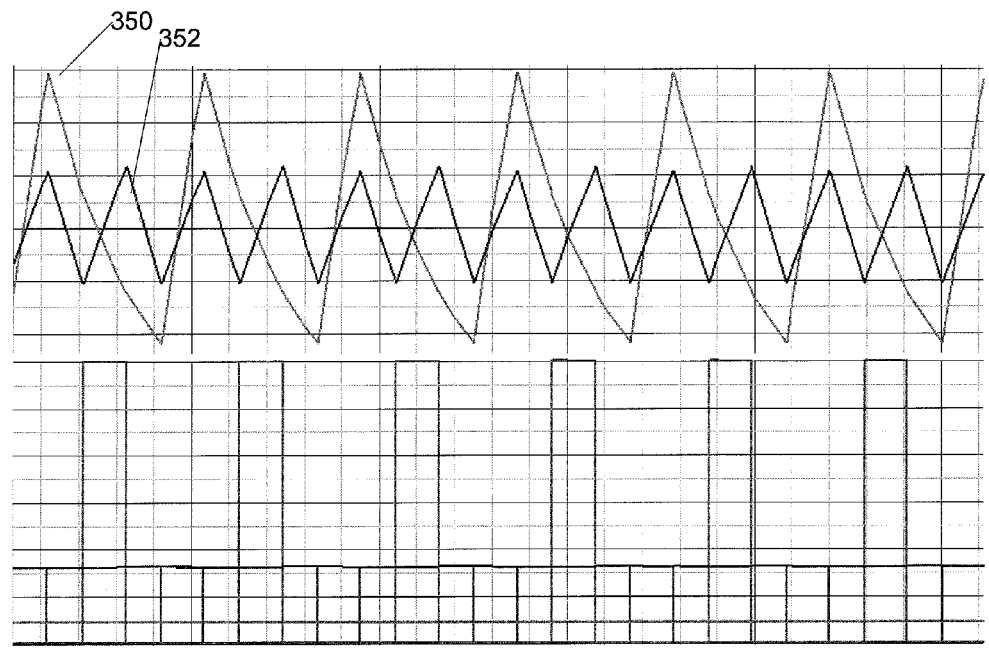
FIG. 10 is an illustration of output ripple reduction at the lowest voltage output of a pair of buck converters having coupled inductors.

FIG. 10 illustrates output current 266 ripple of the second-stage of a two-stage buck converter according to FIG. 6 when no coupling is present between inductors 350, and when suitable magnetic coupling is present between inductors 352. The output current ripple magnitude is more than halved, thereby reducing the amount of capacitance required for filtering. The effective ripple frequency is also doubled, thereby further reducing the amount of capacitance required for filtering.

Figure 11:
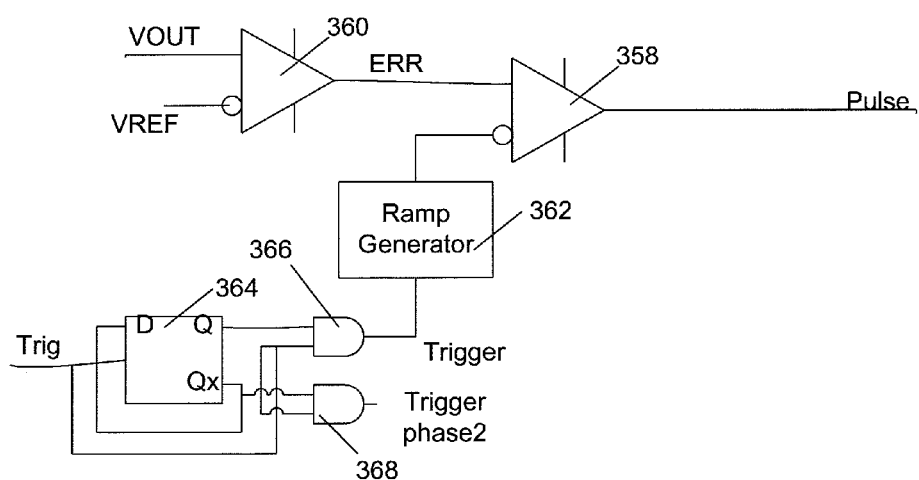
FIG. 11 is a schematic diagram of a control circuit suitable for controlling one phase of a multiphase coupled-inductor convertor having buck subconverters.

FIG. 11 illustrates a controller for use with one phase of a dual-output buck converter according to FIG. 5 as feedback controller 220, 222, or for use as feedback controller 270, 272 of FIG. 6. In this controller, at a reference time provided by timing circuit 268, a pulse output Pulse is set and a ramp begins, provided by ramp generator 362. When the ramp passes an error signal, the error signal provided by an amplifier 360, the pulse register 358 is cleared. The result is a pulse width modulated signal corresponding to the error signal and suitable for driving switch 104 of each buck subconverter. In the illustrated embodiment, a D-flipflop 364 and AND gates 366, 368 of the common timing circuit provide alternating trigger pulses for a first phase or subconverter, and for a second phase or subconverter.

In an alternative embodiment, resembling that of FIG. 6 but having a feedforward pulse generator instead of feedback control 270 for the first stage of the converter, a feedforward input from voltage input 252 adjusts pulsewidth of the first subconverter 256 to provide an approximately constant intermediate voltage 264.

Figure 12:
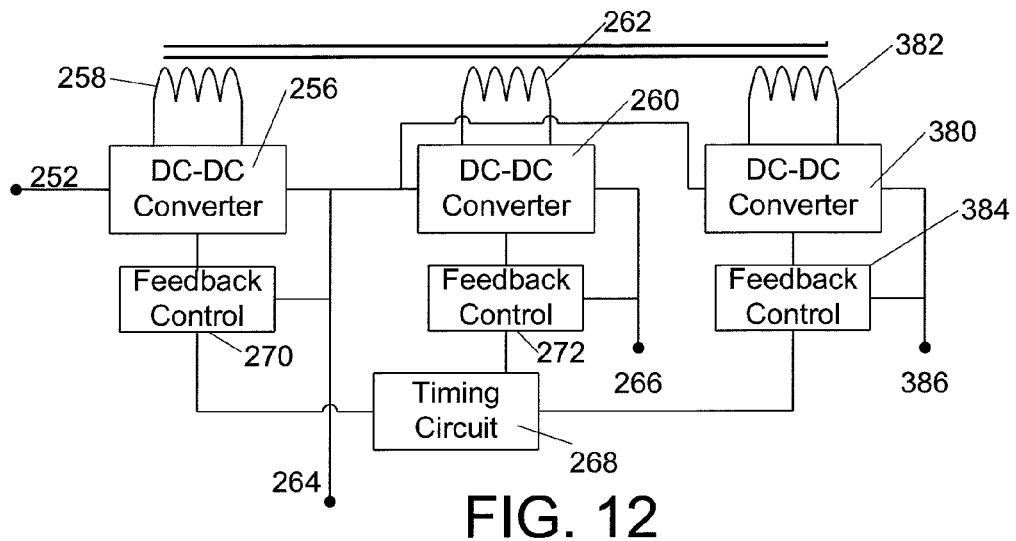
FIG. 12 is a schematic diagram of a multiple-output converter having three subconverters.

Another alternate embodiment, illustrated in FIG. 12, resembling that of FIG. 6 has a third DC-DC converter 380 having a primary energy storage inductor 382 and a feedback controller 384 for adjusting a pulsewidth of the converter 380 to maintain a correct output voltage 386 of the third DC-DC converter. In this embodiment, the energy storage inductor 382 may be wound on a triple core as previously discussed with reference to FIG. 9 and thereby inductively coupled to energy storage inductors 258, 262, of other DC-DC converters of the system, and the third DC-DC converter receives input power from the output 264 of the first DC-DC converter.

Figure 12A:
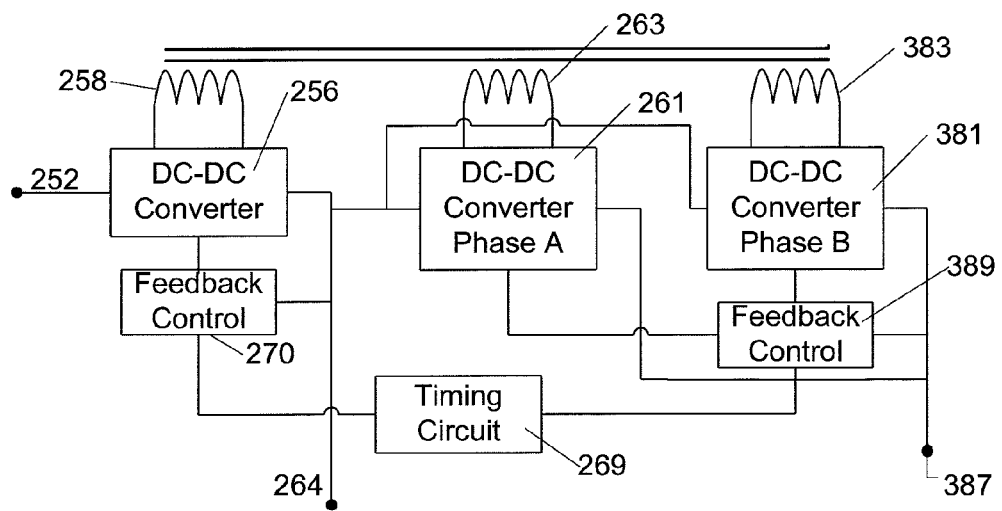
FIG. 12A is a schematic diagram of an alternate multiple-output converter having three subconverters.

FIG. 12A illustrates an alternative embodiment having a first converter 256 fed from an input 252. First converter 256 has inductor 258, and operates under control of feedback controller 270 in the same manner as does first converter 256 of FIGS. 11 and 12. A first output 264 may be taken from first converter 256, and also provides power to two phases 261, 381 of a second multiphase DC-DC converter. Phases 261, 381 provide power to a second output 387, and operates under control of second feedback controller 389. Phases 261, 381 have associated energy-storage inductors 263, 383. First converter 256, as well as phases 261, 381, operate under control of timing circuit 269 to ensure proper phasing of all three converters.

The energy-storage inductor 258 of first converter 256, as well as the energy storage inductor 263 of the phase-A converter 261 and energy storage inductor 383 of the phase-B converter 381, are all magnetically coupled together. As with the embodiments of FIG. 11, and FIG. 12, the embodiment of FIG. 12A may have additional energy-storage inductors of DC-DC converters or DC-DC converter phases also coupled to energy storage inductors 258, 383, 263, 262, 402, 382 as the principles of coupled inductors are not limited to use with two or three phases.

Figure 13:
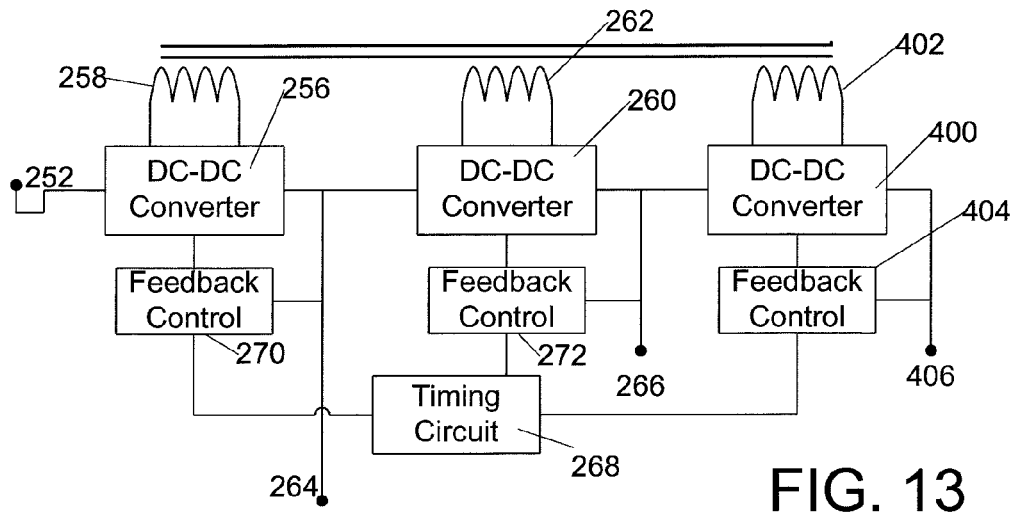
FIG. 13 is a schematic diagram of an alternative embodiment of a multiple output converter having three subconverters.

Another alternate embodiment, illustrated in FIG. 13 and resembling that of FIG. 6, has a third DC-DC converter 400 having a primary energy storage inductor 402 and a feedback controller 404 for adjusting a pulsewidth of the converter 400 to maintain a correct output voltage 406 of the third DC-DC converter. In this embodiment, the energy storage inductor 402 may be wound on a triple core as previously discussed with reference to FIG. 9 and thereby inductively coupled to energy storage inductors 258, 262, of other DC-DC converters of the system. In this alternative embodiment, the third DC-DC converter receives input power from the output 266 of the second DC-DC converter.

It is known that operation of a buck-type DC-DC converters in discontinuous-conduction mode (DCM) while driving light loads may provide higher efficiency than operation in continuous conduction mode (CCM). With reference to FIG. 1, DCM is characterized by an interval in each cycle of converter operation where both switches, such as switches 104, 108, are off and current in the energy storage inductor 106 ceases; CCM is characterized by at least some current in the energy storage inductor 106 throughout each cycle of converter operation.

With reference to FIG. 13, the relative ripple reduction provided on a first output 264 by a multiple-output converter of the present design over a multiple-output converter of conventional design requires that there be current switching in other coupled inductors 262, 402 of other the DC-DC subconverter 260, 400 of the converter. While high current in a subconverter, such as subconverter 400, powered by other subconverters 260, 256 in a system implies high current in those subconverters, the reverse is not true—it is possible that subconverter 256 could need to provide substantial current to output 264 while subconverter 260 is nearly idle.

It has also been observed that, in DCM mode with fixed switching frequency, ripple tends to be greater at high load conditions than in low load conditions. Further, sensing output current in buck converters is easily accomplished; in DCM output current is proportional to switching device pulsewidths.

In order to provide high efficiency at low load, while providing the ability to handle heavy loads, converters according to FIG. 5-6, 8, 12-13, may sense output current or ripple, and, under moderately or heavily loaded condition, operate associated subconverters in CCM, while operating the same subconverters in DCM or PFM (Pulse Frequency Modulation) mode under low load.

In order to maximize efficiency while providing optimum ripple reduction, converters according to FIG. 5-6, 8, 12-13, may sense output current and, under conditions of high load change operating mode of additional subconverters to CCM to ensure there is current flow in coupled inductors. For example, in a converter according to FIG. 13, where output 264 is heavily loaded, subconverters 260 and 400 may operate in CCM to enhance ripple reduction on output 264.

In a particular embodiment of a converter according to FIG. 5, the converter automatically senses output currents and operates according to modes in the following table to ensure that ripple reduction occurs:

TABLE 1

| 206 mode | 214 output load | 210 mode | 216 output load |
|---|---|---|---|
| DCM | light | DCM | light |
| CCM | moderate | DCM | light |
| CCM | high | CCM | light |
| DCM | light | CCM | moderate |
| CCM | moderate | CCM | moderate |
| CCM | high | CCM | moderate |
| CCM | light | CCM | high |
| CCM | moderate | CCM | high |
| CCM | high | CCM | high |

In an alternative embodiment, where DCM is sufficient to handle moderate loads, the converter operates according to the following table:

TABLE 2

| 206 mode | 214 output load | 210 mode | 216 output load |
|---|---|---|---|
| DCM | light | DCM | light |
| DCM | moderate | DCM | light |
| CCM | high | CCM | light |
| DCM | light | DCM | moderate |
| DCM | moderate | DCM | moderate |
| CCM | high | CCM | moderate |
| CCM | light | CCM | high |
| CCM | moderate | CCM | high |
| CCM | high | CCM | high |

The automatic mode-changing described in the above four paragraphs and tables 1 & 2 is applicable both to embodiments having a feedback controller for each subconverter, and to embodiments having a feedforward controller for one or more subconverters.

Figure 14:
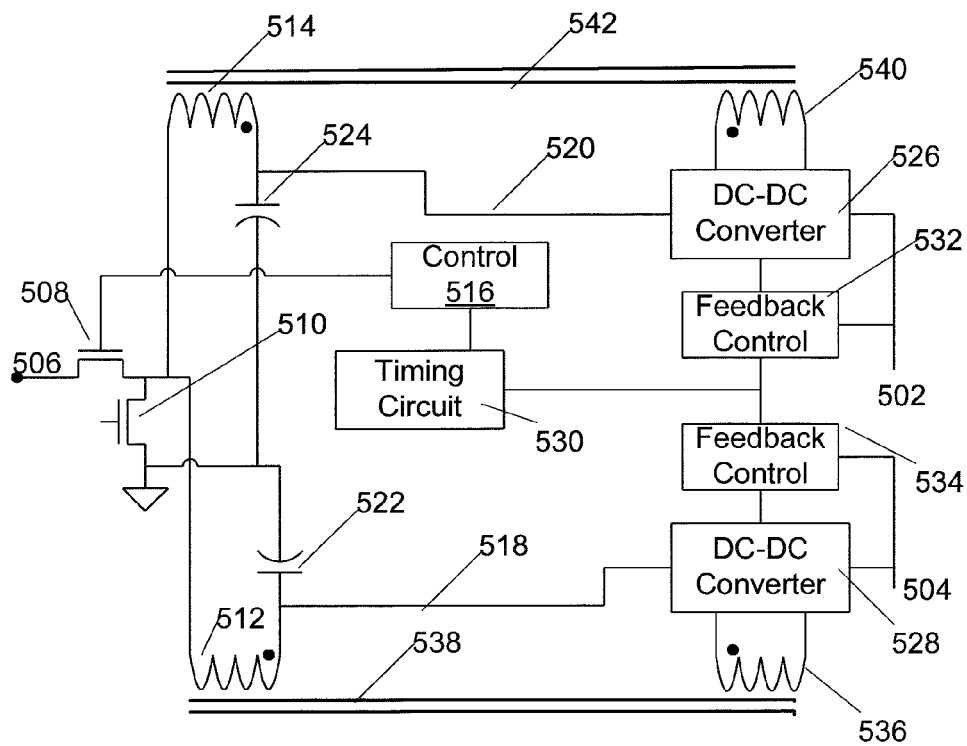
FIG. 14 is a schematic diagram of a multiple-output 2-stage converter having coupled inductors arranged to reduce interaction between outputs.

FIG. 14 illustrates a multiple-output 2-stage converter having coupled inductors for primary and secondary stages of each output 502, 504, and arranged to reduce interaction between outputs. An input 506 provides power to a common switch pair for a first-stage subconverter including positive switching device 508 and negative switching device 510. The common switch pair provides power in parallel to two first-stage inductors 512, 514 and operates in CCM using a pulsewidth determined by controller 516 as either a constant pulsewidth or a pulsewidth determined by feedforward circuitry to provide desired intermediate voltages on separate intermediate nodes 518, 520. Capacitors 522, 524 filter the intermediate nodes 518, 520. Intermediate nodes 518, 520 feed second-stage DC-DC subconverters 526, 528. A common timing circuit 530 controls timing of controller 516, and feedback controllers 532, 534 of second stage DC-DC subconverters 526, 528 to maintain proper phasing of inductor currents. Inductor 536 of DC-DC subconverter 528 is magnetically coupled to first-stage inductor 512 through core 538, and inductor 540 of DC-DC subconverter 526 is magnetically coupled to first-stage inductor 514 through core 542. In this embodiment, transients on output 504 will tend not to couple to output 502, providing relatively good isolation between outputs. In an alternative embodiment having less precise regulation, one or more of feedback controllers 532, 534 may be replaced by feedforward or fixed-pulsewidth controllers.

In the embodiment of FIG. 14, second stage DC-DC subconverters may be buck converters. As explained above, coupling from first stage inductors to second stage inductors tends to increase ripple frequency and reduce ripple voltage to permit minimization of capacitance of output filters of DC-DC subconverters 526, 528. In alternative embodiments, the second stage subconverters are boost and/or buckboost converters.

In the embodiment of FIG. 14, the energy storage inductors 540, 536 of the second stage DC-DC subconverters 528, 526 are not magnetically coupled.

Figure 15:
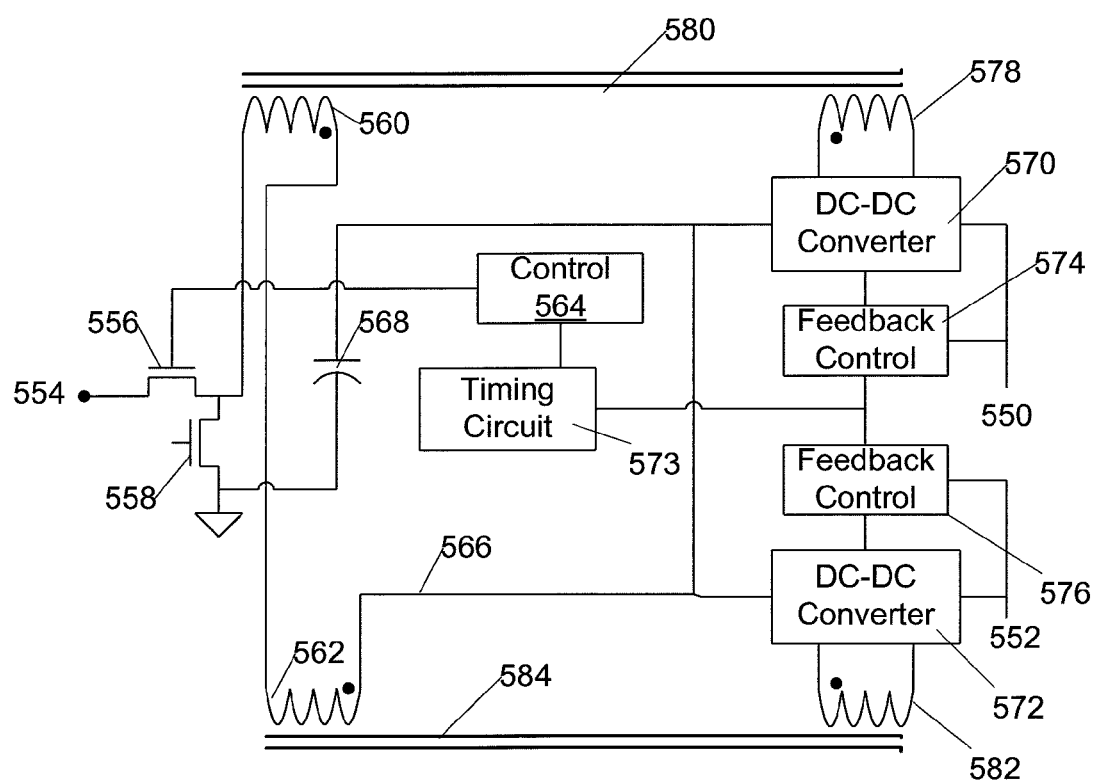
FIG. 15 is a schematic diagram of a multiple-output 2-stage converter having coupled inductors arranged to reduce ripple.

FIG. 15 illustrates a multiple-output 2-stage converter having coupled inductors arranged to reduce ripple, but may allow more coupling of transients from output 550 to output 552 than from output 502 to output 504 of the embodiment illustrated in FIG. 14. Input 554 provides power to a common switch pair including positive switching device 556 and negative switching device 558. The common switch pair form part of a first-stage subconverter and provides power to two, series-connected, first-stage inductors 560, 562 and operates in CCM using a pulsewidth determined by controller 564 as either a constant pulsewidth or a pulsewidth determined by feedforward circuitry to provide desired intermediate voltages on a single intermediate node 566. Intermediate node 566 is filtered by capacitor 568.

Intermediate node 566 feeds second-stage DC-DC subconverters 570, 572. A common timing circuit 573 controls timing of controller 564, and feedback controllers 574, 576 of second stage DC-DC subconverters 570, 572 to maintain proper phasing of inductor currents for optimum ripple reduction. Inductor 578 of DC-DC subconverter 570 is magnetically coupled to first-stage inductor 560 through core 580, and inductor 582 of DC-DC subconverter 572 is magnetically coupled to first-stage inductor 562 through core 584.

In the embodiment of FIG. 15, second stage DC-DC subconverters 570, 572 may be buck converters. As explained above, coupling from first stage inductors 560, 562 to second stage inductors 578, 582 tends to increase ripple frequency and reduce ripple voltage to permit minimization of capacitance of output filters of DC-DC subconverters 570, 572. In alternative embodiments, the second stage subconverters are boost and/or buckboost converters.

In the embodiment of FIG. 15, the energy storage inductors 578, 582 of the second stage DC-DC subconverters 570, 572 are not magnetically coupled to each other.

Figure 16:
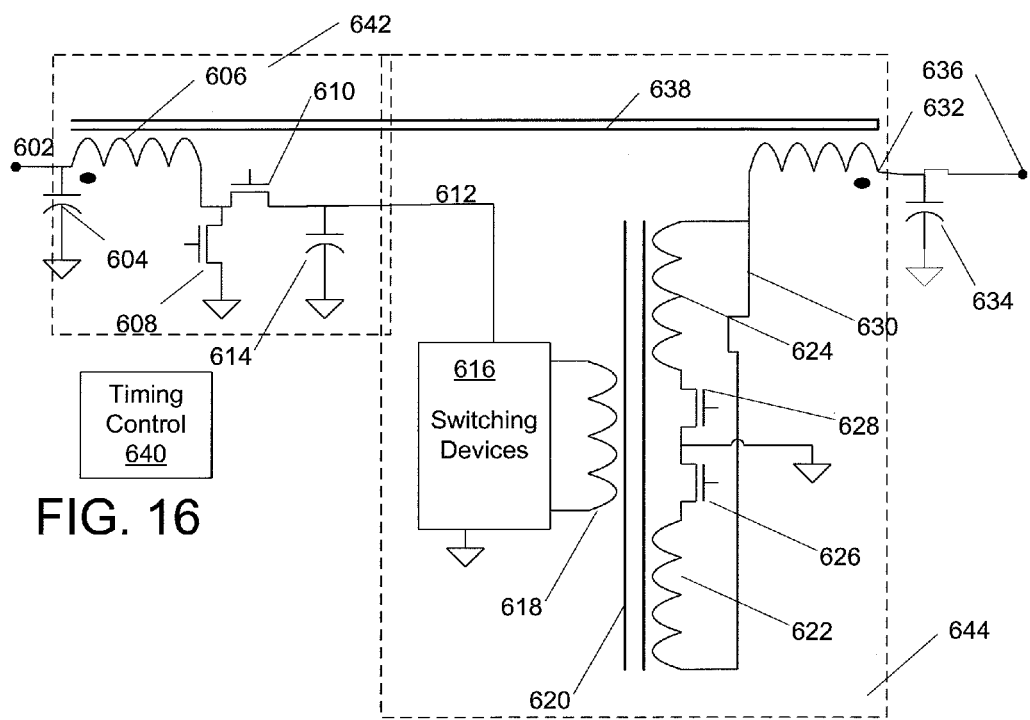
FIG. 16 is a schematic diagram of a boost converter driving an electrically-isolated, push-pull, converter with coupling between the boost stage and a filter inductor of the push-pull stage.

The principles of the present invention are applicable to other converter architectures. For example, a two stage converter having a boost stage and an electrically isolated, push-pull, half-bridge stage is illustrated in FIG. 16. In this embodiment, power is received from input 602, filtered by capacitor 604, and applied to inductor 606. Switching devices 608, 610 operate as previously discussed with reference to switching devices 134, 138 of FIG. 2 to provide an intermediate voltage on node 612 and capacitor 614. The intermediate voltage is applied through switching devices 616 to primary 618 of transformer 620, inducing voltages in transformer 620's secondary windings 622 and 624. Switching devices 626, 628 act to rectify power from secondary windings 622, 624, driving unfiltered output node 630. Output inductor 632 then couples output current into capacitor 634, which filters ripple applied to the output 636. Output inductor 632 is magnetically coupled to inductor 606 through core 638. The entire device operates under control of timing and control logic 640, which enforces a phase offset between the input boost converter 642 of which inductor 606 is the energy storage inductor, and the second stage isolated half-bridge converter 644 of which inductor 632 serves as an output energy-storage inductor. Timing and control 640 may also include appropriate hardware for a feedback or feedforward control loop as required for voltage or current control of output 636.

In alternative embodiments, the half-bridge converter 644 of FIG. 16 may be combined with, and magnetically coupled to energy storage inductors of buck converters similar to those of FIG. 1 or buck-boost converters similar to those of FIG. 2A, these converters replacing the boost converter 642 illustrated in FIG. 16, these additional embodiments are not illustrated for simplicity.

It has been observed that, in an embodiment similar to that of FIG. 5, including those in which both inputs 202, 204 are coupled together, a load transient condition on an output, such as output 216, has a tendency to couple into one or more other outputs, such as output 214. This happens because the change in load on output 216 changes currents in the energy storage inductor 212 of the driving DC-DC converter 210, in part through operation of feedback controller 222. Changes in currents in energy storage inductor 212 in turn cause changes in current at energy storage inductors, such as inductor 208, to which it is magnetically coupled. Changes in currents at inductor 208 in turn cause a transient at any output 214 associated with a DC-DC converter, such as DC-DC converter 206, for which inductor 208 serves as energy storage inductor. Further, the transient on output 214 tends to have an opposite polarity to the initial transient on output 216.

It has been found that, where DC-DC converters have a common reference ground as in the embodiment of FIG. 5, adding a capacitor, such as capacitor 219, between outputs 214, 216 tends to help cancel the transients on both outputs 214, 216 more effectively than an equal capacitance on either output 214, 216 alone; in some embodiments from two to four times more effectively.

Figure 17:
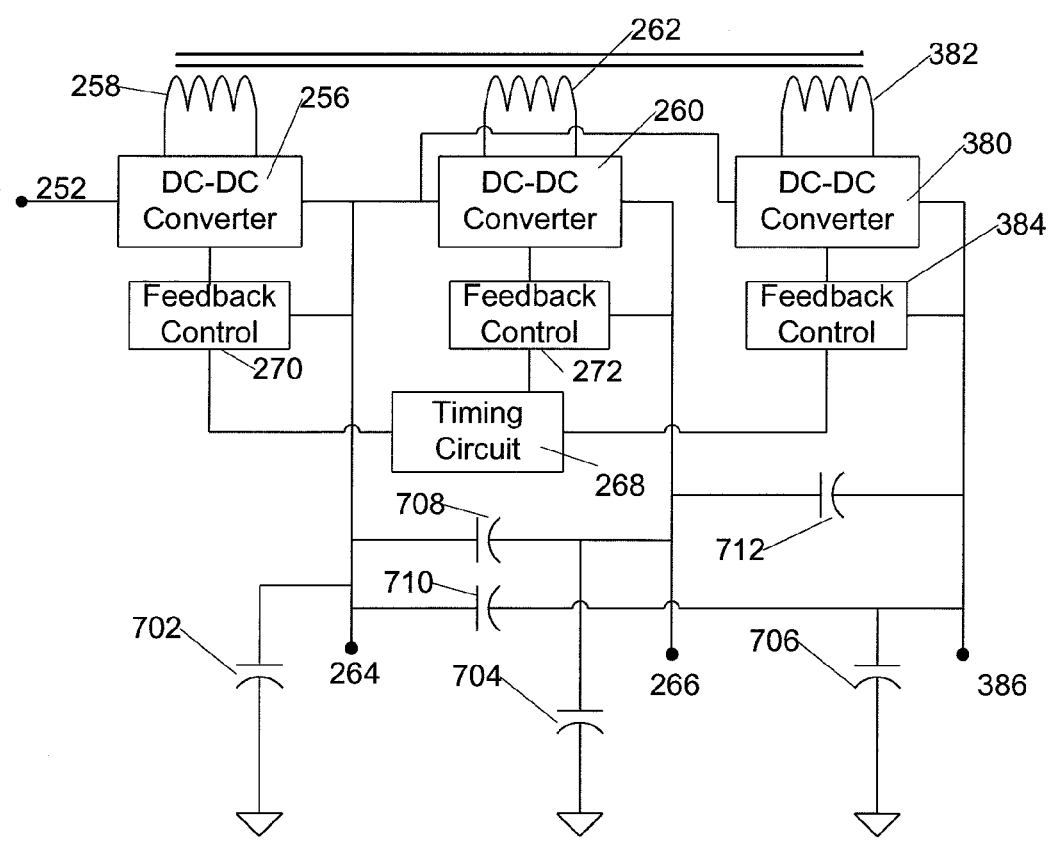
FIG. 17 is a schematic diagram of a multiple-output converter having three subconverters and transient suppression capacitors.

In some embodiments, transient suppression capacitors, such as capacitor 219, are added between two, three, or more outputs; such capacitors may be added and can be beneficial in some embodiments resembling those of FIGS. 6, 8, 12, 12A, and 13 as illustrated in FIG. 17.

Those components illustrated in FIG. 17 having the same reference numbers as in FIG. 12 operate in the same way as discussed with reference to FIG. 12, for simplicity their description will not be repeated here.

Each DC-DC converter, such as DC-DC converters 256, 260, 380, has an output capacitor for filtering ripple on the associated output, such as outputs 264, 266, 386.

A traditional way to filter output voltage transients due to current changes on outputs is to increase capacitance of output capacitors of the DC-DC converters, such as by increasing their values or by adding transient filter capacitors 702, 704, 706. Because of the opposite polarity of induced transients from the initial output transient, transient cancellation capacitors 708, 710, 712 may be added between some or all of outputs 264, 266, 386. Induced transients may vary in magnitude from output to output, depending on factors such as output voltages, degree of magnetic coupling, output currents, and other factors. Further, because outputs with low transient magnitude induce smaller disturbances at other outputs than outputs with high transients magnitude, in some embodiments, transient cancellation capacitors 708, 710 between high 264 and low transient outputs 266, 386 are provided, but transient cancellation capacitors 712 between different low-transient outputs are omitted.

Use of the transient cancellation capacitors, such as capacitors 708, 710, 712 permits operation with reduced values of transient filter capacitors 702, 704, 706 than otherwise required for converters with coupled inductors and independent voltage outputs and may produce a cost savings in a multiple-output converter system.

Changes may be made in the above methods and systems without departing from the scope hereof Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

The invention claimed is:

1. A multiple-output converter comprising:
    separate first and second DC-DC subconverters, each DC-DC subconverter selected from the group consisting of a buck, boost, buck-boost, and half-bridge converter and comprising at least one primary energy storage inductor and driving a respective power output, each DC-DC subconverter having a feedback controller for adjusting on-time of at least one switching device of the converter in response to changes in its respective power output;
    a timing circuit such that a switching device of the first DC-DC subconverter applies power to its primary energy storage inductor at different times than a switching device of the second DC-DC subconverter applies power to its primary energy storage inductor;
    wherein the power output of the first DC-DC subconverter is electrically coupled to a first output node, the power output of the second DC-DC subconverter is electrically coupled to a second output node, and the second output node is electrically different from the first output node; and
    wherein the primary energy storage inductors of the first and second DC-DC subconverter are magnetically coupled.

2. The converter of claim 1 wherein the first and second DC-DC subconverters are boost converters.

3. The converter of claim 1 wherein at least one of the first and second DC-DC subconverter is a buck-boost converter.

4. The converter of claim 1 wherein the first and second DC-DC subconverters are buck converters.

5. The converter of claim 4 wherein the second DC-DC subconverter receives power input from the power output of the first DC-DC subconverter.

6. The converter of claim 5 further comprising a third DC-DC subconverter receiving power input from the power output of the first DC-DC subconverter.

7. The converter of claim 4 wherein the converter senses output current at the power output of the first DC-DC subconverter, wherein the second DC-DC subconverter has operating modes including discontinuous conduction mode (DCM) and continuous conduction mode (CCM), wherein the second DC-DC subconverter operates in DCM if both the first and the second DC-DC subconverter are lightly loaded, and wherein the second DC-DC subconverter operates in CCM if the first DC-DC subconverter is heavily loaded.

8. The converter of claim 4 further comprising at least one transient cancellation capacitor coupled between the first output node and the second output node.

9. The converter of claim 1, wherein the first output node is at a different voltage than the second output node.

10. A multiple-output converter comprising:
    a first and a second DC-DC subconverter, each DC-DC subconverter selected from the group consisting of a buck, boost, buck-boost, and half-bridge converter and comprising at least one primary energy storage inductor and driving a respective power output, each DC-DC subconverter having a feedback controller for adjusting on-time of at least one switching device of the converter in response to changes in its respective power output, the first and second DC-DC converters configured to operate simultaneously; and
    a timing circuit such that a switching device of the first DC-DC subconverter applies power to its primary energy storage inductor at different times than a switching device of the second DC-DC subconverter applies power to its primary energy storage inductor;
    wherein the power output of the first DC-DC subconverter is electrically coupled to a first output node, the power output of the second DC-DC subconverter is electrically coupled to a second output node, and the second output node is electrically different from the first output node; and
    wherein the primary energy storage inductors of the first and second DC-DC subconverter are magnetically coupled.

* * * * *